United States Patent Office 3,558,664
Patented Jan. 26, 1971

---

3,558,664
DIHYDRO-5-HYDROXY-4,4-DIALKYL-3 (2H)-FURANONES
Alfred G. Robinson, Alden E. Blood, and Hugh J. Hagemeyer, Jr., Longview, Tex., assignors to Eastman Kodak Company, Rochester, N.Y., a corporation of New Jersey
No Drawing. Filed Feb. 12, 1969, Ser. No. 798,810
Int. Cl. C07d 5/04
U.S. Cl. 260—347.8
10 Claims

ABSTRACT OF THE DISCLOSURE

Hydroxy furanones having the general formula

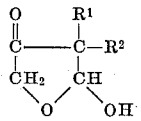

wherein $R^1$ and $R^2$ are the same or different alkyl groups of 1 to 10 carbon atoms are prepared by thermal decomposition of compounds having the formula

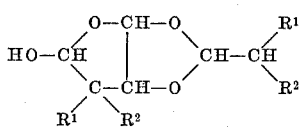

wherein $R^1$ and $R^2$ are as previously described. The thermal decomposition of the starting material is preferably effected at a temperature in the range of 120° C. to 200° C. in the presence of an alkali metal salt of an organic acid. The hydroxy furanones are useful solvents and intermediates for the preparation of polyols useful, for example, as solvents and in the manufacture of polyesters.

---

This invention relates to novel compounds of the furan class and to their preparation. More particularly, the invention is concerned with a novel class of hydroxy furanones and to methods for their preparation.

The novel hydroxy furanone compounds of the present invention can be regarded generically as dihydro-5-hydroxy-3(2H)-furanones. The invention compounds have the formula

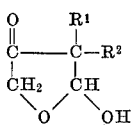

wherein $R^1$ and $R^2$ are the same or different and each of $R^1$ and $R^2$ are alkyl groups of 1 to 10 carbon atoms, preferably 1 to 4 carbon atoms. The invention compounds have utility as solvents and in the production of polyols. Polyols are widely used chemicals having a utility as solvents and as components of such valuable materials as alkyd resins and plasticizers for resinous materials such as polyvinyl chloride compositions.

The novel hydroxy furanones can be prepared according to the method of this invention by the thermal decomposition of certain bicyclic furodioxoles. Thermal decomposition of the bicyclic furodioxoles to form the hydroxy furanones of this invention can be effected by the non-catalytic heating of the furodioxole at elevated temperatures. Preferably, thermal decomposition of the bicyclic furodioxole starting material is effected by heating the compound in the presence of a catalyst at decomposition temperatures. The thermal decomposition of the bicyclic furodioxole to form the new hydroxy furanone compounds of the invention can be illustrated by the following equation

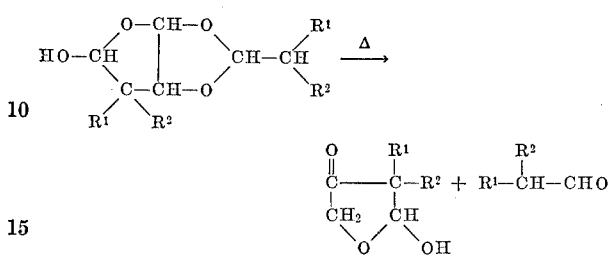

wherein $R^1$ and $R^2$ are as previously described. The product can be recovered by any suitable means from the crude reaction product.

Non-catalytic thermal decomposition of the bicyclic furodioxide is generally effected by heating the starting material to a temperature sufficiently high to initiate and continue the reaction, and preferably not more than about 20° C. higher than the temperature required to initiate the decomposition reaction. Suitable temperatures are in the range of 150° C. to 200° C.

Preferably, thermal decomposition of the bicyclic furodioxole is effected by heating the compound in the presence of certain catalysts at temperatures in the range of 120° C. to 200° C., preferably 130° C. to 150° C. The catalysts cause almost quantitative conversion of the furodioxole to the hydroxy furanones of the invention with little, if any, formation of tar and polymeric by-products.

The catalysts which have been found effective in promoting the thermal decomposition reaction are the alkali metal salts of organic acids having up to 24 carbon atoms, preferably up to 8 carbon atoms. Representative catalysts include sodium acetate, potassium isobutyrate, sodium 2-ethylhexanoate, sodium oleate, etc. The concentration of the catalyst is not critical. Generally, the catalyst is employed in concentrations in the range of from about 0.1 to about 20 weight percent, preferably 0.5 to about 12 weight percent, based on bicyclic furodioxole charge.

The pressure at which thermal decomposition of bicyclic furodioxole to hydroxy furanone occurs according to the process of this invention is not critical. The reaction proceeds at superatmospheric, atmospheric, and subatmospheric pressures. Excellent results have been obtained at subatmospheric pressure, e.g. 5 mm. to 100 mm. Hg.

Bicyclic furodioxole compounds suitable for use in the preparation of the novel hydroxy furanones of this invention include tetrahydro-2-alkyl-6,6-dialkylfuro-[2,3-d]-1,3-dioxol-5-ols of the formula

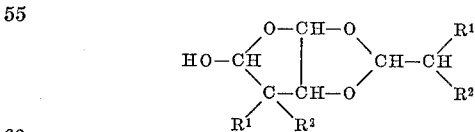

wherein $R^1$ and $R^2$ are as previously described. These can be prepared by condensing glyoxal with an aldehyde having a single alpha hydrogen atom in the presence of certain aqueous bases at temperatures in the range of 10° C. to 50° C. Aldehydes suitable in the condensation include isobutyraldehyde, 2-ethylhexaldehyde, 2-methylpentaldehyde and 2-ethylbutyraldehyde. These aldehydes have the general formula

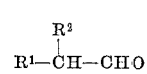

wherein $R^1$ and $R^2$ are the same or different and each of $R^1$ and $R^2$ are alkyl groups of 1 to 10 carbon atoms, preferably 1 to 4 carbon atoms. The aqueous bases which are most effective in the condensation include the alkali metal carbonates and acetates such as potassium carbonate, sodium carbonate and sodium acetate. A preferred bicyclic furodioxole is tetrahydro-2-isopropyl-6,6-dimethylfuro-[2,3-d]-1,3-dioxol-5-ol, which is formed from the condensation of isobutyraldehyde and glyoxal. The tetrahydro-2-isopropyl - 6,6 - dimethylfuro-[2,3-d]-dioxol-5-ol thermally decomposes according to the method of our invention to yield dihydro-5-hydroxy-4,4-dimethyl-3(2H)-furanone in a particularly preferred embodiment of our invention.

The following examples are set forth for purposes of illustration, and it should be understood that they are not to be construed as limiting the invention in any manner.

EXAMPLE I

Preparation of the bicyclic furodioxole, tetrahydro-2-isopropyl-6,6-dimethylfuro-[2,3-d]-1,3-dioxol-5-ol A solution of 450 g. of potassium carbonate dissolved in 450 g. of water is added incrementally to a stirred mixture consisting of 6000 ml. of water, 1800 g. of isobutyraldehyde and 1800 g. of glyoxal. The time required for addition is 2 hours. During the addition, the reaction temperature increases from 24° C. to 42° C. After addition is complete, the mixture is stirred for 4 additional hours. An organic layer is separated from the reaction mixture. The crude product is washed once with an equal volume of water and then is heated to 50° C. at reduced pressures to remove water and unreacted aldehydes. The resulting base product solidifies to give a white waxy solid. Tetrahydro-2-isopropyl-6,6-dimethylfuro - [2,3-d] - 1,3-dioxol-5-ol (2020 g.) is obtained.

EXAMPLE 2

Dihydro-5-hydroxy-4,4-diethyl-3(2H)furanone

A mixture consisting of 1200 g. of tetrahydro-2-isopropyl-6,6 - dimethylfuro - [2,3-d] - 1,3 - dioxol-5-ol and 24 g. of sodium acetate is heated to 135° C. using a vacuum of 30 mm. Hg. The crude decomposition mixture is separated by distillation. Redistillation of the crude product gives 319 g. of isobutyraldehyde and 686 g. of dihydro-5-hydroxy-4,4-dimethyl - 3(2H) - furanone, B.P. 101°-102° C. at 10 mm. Hg. The structure assignment is established by the following analyses:

| Analyses | Theory | Found |
|---|---|---|
| Molecular weight | 130 | 127 |
| NMR spectroscopy | Consistent with proposed structure | |
| IR spectroscopy | do | |

EXAMPLE 3

A series of runs is made to compare the efficacy of the thermal decomposition of tetrahydro-2-isopropyl-6,6-dimethylfuro-[2,3-d]-1,3-dioxol-5-ol under (a) non-catalytic conditions (Run 1); (b) conditions employing the catalysts of the invention (Runs 2-4); and (c) conditions employing other catalytic materials (Run 5).

| Run | Catalyst concentration percent | Catalyst | Base temp., °C. | Percent conversion to dihydro-5-hydroxy-4,4-dimethyl-3(2H)-furanone |
|---|---|---|---|---|
| 1 | 0 | None | 170-190 | 14 |
| 2 | 2 | Potassium isobutyrate | 130-145 | 86 |
| 3 | 0.5 | do | 130-150 | 85 |
| 4 | 10 | Sodium acetate | 130-142 | 94 |
| 5 | 2 | Sodium sulfate | 170-190 | 17 |

EXAMPLE 4

Preparation of the polyol, 3,3-dimethyl-1,2,4-butanetriol

One mole (130 g.) of dihydro-5-hydroxy-4,4-dimethyl-3(2H)-furanone is mixed with 13 g. of Raney nickel and the mixture is reduced at 175° C. for 4 hours at 3000 p.s.i. $H_2$. Raney nickel is removed by filtration. The filtrate is distilled to give 66 g. of 3,3-dimethyl-1,2,4-butanetriol.

Although the invention has been described in detail with particular reference to preferred embodiments thereof, it will be understood that variations and modifications can be effected within the spirit and scope of the invention as described hereinabove.

We claim:
1. Dihydro-5-hydroxy-4,4-dialkyl - 3(2H) - furanone of the formula:

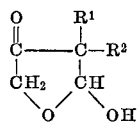

wherein $R^1$ and $R^2$ are the same or different and each of $R^1$ and $R^2$ are alkyl groups of 1 to 10 carbon atoms.

2. The compounds of claim 1 wherein each of $R^1$ and $R^2$ are alkyl groups of 1 to 4 carbon atoms.

3. Dihydro-5-hydroxy-4,4-dimethyl-3(2H)-furanon.

4. A process for preparing compounds of the formula

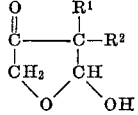

which comprises heating a bicyclic furodioxole of the formula

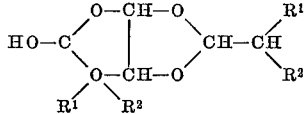

in the presence of an alkali metal salt of an organic acid having up to 24 carbon atoms at a temperature in the range of 120° C. to 200° C., wherein $R^1$ and $R^2$ are the same or different and each of $R^1$ and $R^2$ are alkyl groups of 1–10 carbon atoms.

5. A process in accordance with claim 4 wherein each of $R^1$ and $R^2$ represents an alkyl group of 1 to 4 carbon atoms and said alkali metal salt contains up to 8 carbon atoms.

6. A process in accordance with claim 5 wherein the concentration of said alkali metal salt is in the range of 0.1 to 20 weight percent, based on the weight of said bicyclic furodioxole.

7. A process in accordance with claim 6 wherein the concentration of said alkali metal salt is in the range of 0.2 to 12 weight percent, based on the weight of said bicyclic furodioxole.

8. A process in accordance with claim 4 wherein the temperature is in the range of 130° to 150° C.

9. A process in accordance with claims 4 wherein each of $R^2$ and $R^2$ is methyl.

10. A process in accordance with claims 5 wherein the temperature is in the range of 130° to 150° C. and each of $R^1$ and $R^2$ is methyl.

References Cited

Korobitsyna et al.: Chemical Abstracts (1957), vol. 52, p. 9062i.

ALEX MAZEL, Primary Examiner

R. L. DENTZ, Assistant Examiner

U.S. Cl. X.R.

106—311; 260—33.8, 75, 340.9

PO-1050
(5/69)

UNITED STATES PATENT OFFICE
CERTIFICATE OF CORRECTION

Patent No. 3,558,664                    Dated January 26, 1971

Inventor(s) Alfred G. Robinson III, Alden E. Blood, and Hugh J. Hagemeyer, Jr.

It is certified that error appears in the above-identified patent and that said Letters Patent are hereby corrected as shown below:

Column 4, Claim 3, the word "furanon" should read - - furan

Column 4, Claim 4, the second formula should read as follow

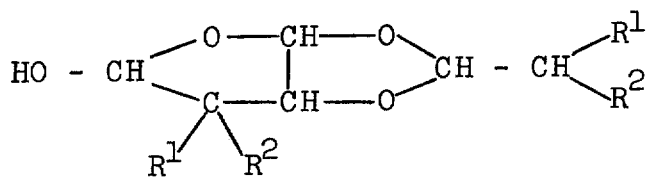

Column 5, Claim 9, the word "claims" should be --claim --.

Column 5, Claim 10, the word "claims" should be - - claim -

Signed and sealed this 15th day of June 1971.

(SEAL)
Attest:

EDWARD M. FLETCHER, JR.
Attesting Officer

WILLIAM E. SCHUYLER,
Commissioner of Pate